(12) United States Patent
Kendall

(10) Patent No.: US 7,636,504 B2
(45) Date of Patent: Dec. 22, 2009

(54) OPTICAL FIBRE ALIGNMENT MECHANISM

(75) Inventor: Adrian Kendall, East Kilbride (GB)

(73) Assignee: Intense Limited, High Blantyre, Glasgow (GB)

( * ) Notice: Subject to any disclaimer, the term of this patent is extended or adjusted under 35 U.S.C. 154(b) by 428 days.

(21) Appl. No.: 10/537,390

(22) PCT Filed: Nov. 21, 2003

(86) PCT No.: PCT/GB03/05074

§ 371 (c)(1), (2), (4) Date: Jan. 31, 2007

(87) PCT Pub. No.: WO2004/053556

PCT Pub. Date: Jun. 24, 2004

(65) Prior Publication Data

US 2007/0165988 A1 Jul. 19, 2007

(30) Foreign Application Priority Data

Dec. 6, 2002 (GB) ................................. 0228457.8

(51) Int. Cl.
*G02B 6/26* (2006.01)
(52) U.S. Cl. .......................................... 385/52; 385/15
(58) Field of Classification Search .................. 385/52, 385/15
See application file for complete search history.

(56) References Cited

U.S. PATENT DOCUMENTS

| 5,222,170 | A | 6/1993 | Bargar et al. |
| 5,386,488 | A | 1/1995 | Oikawa |
| 6,190,056 | B1 | 2/2001 | Kwon et al. |
| 2002/0001324 | A1 | 1/2002 | Miyokawa et al. |
| 2002/0015566 | A1 | 2/2002 | Mun et al. |

FOREIGN PATENT DOCUMENTS

| DE | 3405838 A1 | 8/1985 |
| GB | 2124402 A | 2/1984 |
| GB | 2296100 A | 6/1996 |

OTHER PUBLICATIONS

European Patent Office, International Search Report for PCT/GB03/05074, Mar. 17, 2004.

*Primary Examiner*—Jennifer Doan
(74) *Attorney, Agent, or Firm*—Momkus McCluskey, LLC; Jefferson Perkins

(57) ABSTRACT

An alignment and fixing apparatus for positioning and securing an optical fibre in alignment with an optical source, in which the optical fibre is coupled, at two longitudinally separated points along the fibre, to respective ones of a pair of cantilever arms. Lateral movement of one of the cantilever arms induces a smaller lateral movement of the other cantilever arm, thereby enabling precision lateral displacement of an end of the fibre proximal to the optical source.

30 Claims, 1 Drawing Sheet

OPTICAL FIBRE ALIGNMENT MECHANISM

Figure 1:
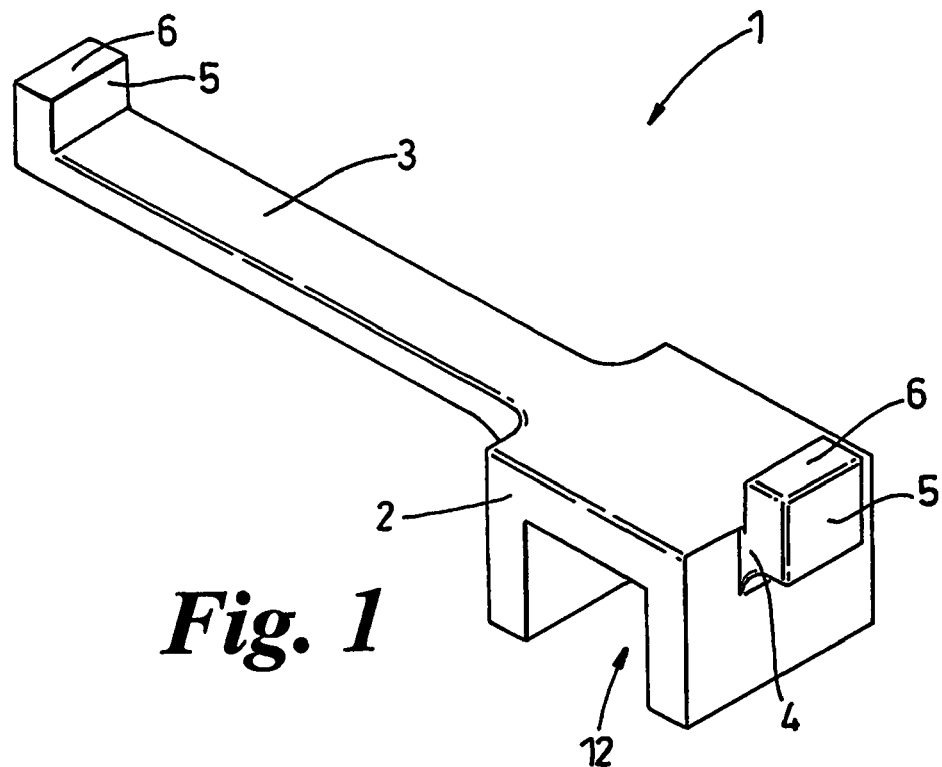

The present invention relates to optical fibres and in particular to methods and apparatus for the alignment and permanent fixing of a fibre with respect to an optical device.

The alignment and subsequent fixing of a single mode fibre optic cable relative to an optical device e.g. a source of light such as a semiconductor laser diode, are defining steps in enabling an efficient and stable optical coupling between the two components. Typically, to obtain the required efficiencies the components must be manipulated at sub-micron resolutions and then secured without introducing significant deviation from the alignment position as a result of the fixing process. Reliable operation of the device depends upon a high degree of optical coupling between the fibre and the light source.

Conventional fixing mechanisms in the art use adhesives, solders or micro welding, wherein it is desired that the fixing mechanism maintains a stable alignment throughout the projected lifetime of the device. In submarine telecommunications for example, the fibre assembly may be expected to operate reliably without the need for servicing for a period typically exceeding 25 years.

A number of different fixing and alignment mechanisms have been proposed that allow the fibre to be fixed with varying degrees of complexity and optical coupling efficiency.

The micro welding technique is common in the art for the alignment of fibres to diode lasers. Typically metal sleeves are attached over the glass fibre to provide a welding surface. Various structures have been employed to attach the fibre to the substrate supporting the laser diode. The simplest structures comprise a metal clamp or "saddle" which is positioned over the sleeve and is then spot-welded to the substrate and the sleeve by means of a high power spot welding laser. This is the technique described in GB 2,124,402 to align and secure the fibre to the substrate member.

Alternative approaches have attempted to secure the fibre by allowing the metal sleeve to be aligned to the laser diode within a sufficiently large diameter bore to allow radial movement to obtain optimum alignment of the fibre. Final fixing is achieved by welding a washer concentrically attached to the sleeve, to the surface the bore passes through.

A further approach is described in GB 2,296,100 where a more complex version of the saddle structure is used to secure the fibre. The final alignment corrections are applied, post-weld, by plastically deforming the members of the retaining saddle in a manner that compensates for the positional errors by distorting the fibre.

It is commonly known in the art that the tolerance of the components and the space between the components which the weld must bridge, affect the magnitude of the displacement of the fibre relative to the optimum position. The art attempts to minimise this effect by applying positional corrections to the fibre after the welding process. This may be achieved by permanently distorting the sleeve or the retaining device.

The degree of correction and location at which it is applied are related to the longevity of the stability of the coupling. In the art it is well known that the greater the required positional correction, the shorter the stable lifetime of the optical coupling.

A disadvantage of the existing alignment and fixing mechanisms is that each approach requires precision manufacture of the alignment and securing components. In normal manufacturing practice the desired minimum spacing between the welded components is rarely achieved. This is particularly apparent at the interface of the metal sleeve and the alignment mechanism, where gaps exceeding the desired tolerances are common.

It is an object of the present invention to minimise or eliminate the gap between the sleeve and the alignment mechanism by providing an apparatus for aligning and fixing the fibre, without resorting to specifying tolerances on components that are onerous in comparison to the scale of the components. In this way, distortion introduced by the welding process attempting to bridge the gap is minimised, along with the necessary positional corrections.

It is a further object of the present invention to provide a reliable optical coupling that is stable under the normal operating conditions for the projected lifetime of the device.

It is a yet further object of the present invention to provide a fibre alignment and fixing apparatus that requires fewer components than prior art devices, and consequently offers reduced implementation costs.

The present invention provides an alignment and fixing apparatus for positioning and securing an optical fibre in alignment with an optical source, in which the optical fibre is coupled, at two longitudinally separated points thereon, to a pair of cantilever arms, such that lateral movement of one of the cantilever arms induces a smaller lateral movement of the other cantilever arm, thereby enabling precise lateral displacement of an end of the fibre proximal to the optical source.

In a general aspect, the fibre is coupled to the at least two cantilever arms such that lateral displacements to the fibre at one longitudinal position are communicated in an attenuated form to a second longitudinal position that is closer to the optical source. In this way, larger lateral movements to the longer cantilever arm can be converted to much smaller lateral movements in the fibre at the end of the second cantilever.

According to one aspect, the present invention provides an apparatus for aligning and fixing an optical fibre relative to an optical source, comprising:
 first and second fixing brackets, each fixing bracket including:
  a support member for attachment to a substrate;
  first and second cantilever arms extending from the support member in opposing directions, each cantilever arm including fibre engagement means for engaging with the optical fibre;
 the apparatus further comprising a substrate including support means for receiving the support members so as to dispose the first and second fixing brackets such that the fibre engagement means of the first fixing bracket oppose the fibre engagement means of the second fixing bracket, for receiving and supporting an optical fibre therebetween at two longitudinal positions of the optical fibre.

According to another aspect, the present invention provides an apparatus for supporting and aligning an optical fibre comprising:
 a fixing bracket, the fixing bracket including:
 a support member for attachment to a substrate; and
 a first relatively long cantilever arm and a second relatively short cantilever arm extending from the support member in opposing directions, each cantilever arm including fibre engagement means for engaging with the optical fibre at different longitudinal positions of the fibre.

According to a further aspect, the present invention provides a method for aligning and fixing an optical fibre relative to an optical source, comprising the steps of:
 positioning first and second fixing brackets on a substrate such that first and second fibre engagement means of the first fixing bracket oppose first and second fibre engagement means of the second fixing bracket;

positioning an optical fibre intermediate the first and second fixing brackets for support therebetween at two longitudinal positions of the fibre;

securing the first and second fixing brackets to support means on the substrate;

securing the first and second fixing brackets to the optical fibre at the points of contact of the fibre engagement means to the fibre; and adjusting the fibre alignment relative to the optical source.

According to a further aspect, the step of adjusting the fibre alignment comprises the steps of:

distorting a first cantilever arm of each of the first and second fixing brackets;

generating a resultant distortion in a second cantilever arm of each of the first and second fixing brackets in response to the distortion in the first cantilever arm; and correcting the alignment of the optical fibre as a consequence of one or more cantilever arm distortions.

According to a further aspect, the present invention provides a method for supporting and aligning an optical fibre to an optical source, comprising the steps of:

coupling the optical fibre, at two longitudinally separated positions thereof, respectively to fibre engagement means on each of a first relatively long cantilever arm and a second relatively short cantilever arm of a fixing bracket; and distorting the first cantilever arm and thereby generating a resultant distortion in the second cantilever arm, thereby adjusting the alignment of the fibre relative to the optical source.

Figure 2:
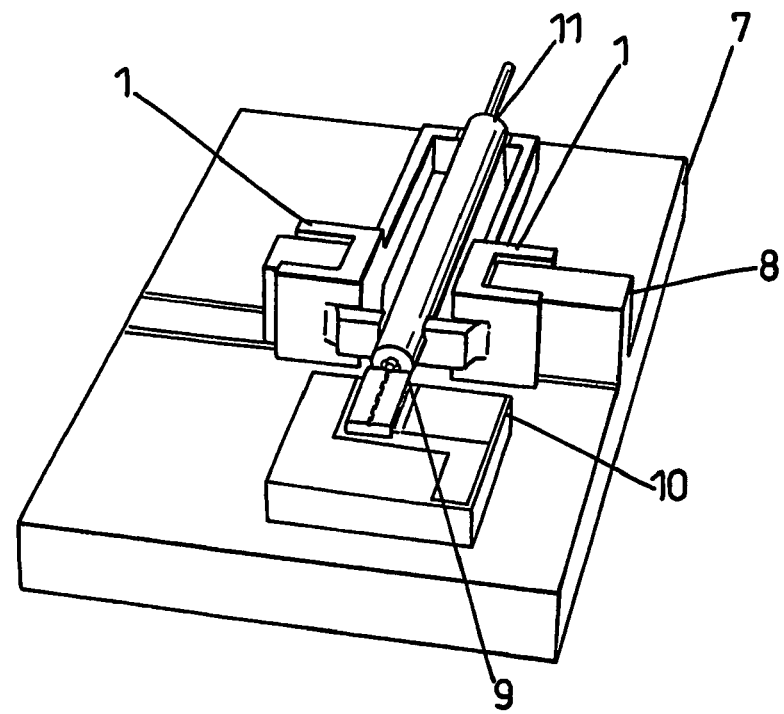

Embodiments of the present invention will now be described by way of example and with reference to the accompanying drawings in which:

FIG. 1 shows a perspective front and side view of a cantilever bracket according to one embodiment of the present invention; and FIG. 2 shows a perspective top view of the substrate and a pair of cantilever brackets, securing the optical fibre to the optical source, according to one embodiment of the present invention.

With reference to FIGS. 1 and 2, a preferred embodiment of the present invention comprises a double cantilever bracket 1 of unequal length cantilevers 3, 4. The cantilevers comprise both longer 3 and shorter length arms 4. Preferably, the minimum length of the shorter arm is approximately 0.2 or 0.3 mm.

Preferably, the longer cantilever arm 3 is at least five times greater in length than the shorter cantilever arm 4. The length ratio of the arms determines the movement of both the longer and shorter arms during an adjustment and alignment correction as will be described later.

Although the preferred embodiment comprises a pair of cantilever arms, a particular fixing bracket could well incorporate more than two arms.

The shorter cantilever 4 is preferably of greater cross-sectional area then the longer cantilever 3 and both are preferably rectangular in cross-section.

At the end of each cantilever is a laterally extending finger, forming one of a pair of fibre engagement means 5 for aligning and fixing the optical fibre position. Each fibre engagement-means includes a contact face 6 which is preferably also rectangular in cross section.

The cantilever arms 3, 4 project in opposing directions from a support member 2. Preferably, the support member comprises a metal block with a channel 12 running therethrough. The block engages with a corresponding support means 8 on a suitable rigid substrate 7, preferably a metal plate. The support means 8 preferably takes the form of raised blocks that are either securely attached to, or fabricated as part of, the substrate 7.

The cantilever brackets 1 are used in pairs and each of the pairs is located on a respective raised block 8 as a means to position and secure the cantilever fixing bracket 1 to the substrate. In the preferred embodiment, the brackets are configured to be in opposition, with the fibre engagement means 5 of one bracket facing the fibre engagement means 5 of the other bracket.

The opposing brackets may be configured and positioned to be mirror images of each other and in the preferred embodiment this configuration is adopted. However provision could be made in other embodiments to allow a small longitudinal offset to be introduced between the opposing brackets as appropriate provided that this does not interfere with the functionality to be described later.

As shown in FIG. 2, an optical source 9 is mounted on the metal substrate 7 either by direct attachment or through the use of an intermediate support means, such as a mounting block 10. The raised blocks 8 on the substrate are dimensioned to reside within the channels 12 of blocks 2 of the cantilever brackets 1 and allow lateral movement of the brackets on the raised blocks 8 to enable the separation between the contact faces 6 of the opposed brackets to be varied.

The engagement of the raised blocks 8 with the respective channels 12 of the cantilever brackets 1 also enables the respective heights of the cantilever brackets above the substrate to be varied, if desired.

The expression "optical fibre" is used herein to describe the optical carrier (i.e. light guide) together with any sheathing material that may be required or desired in normal use or for fixing and alignment. For example, the optical carrier may be sheathed in a sleeve suitable for forming a surface for attachment to the fibre engagement means. This may be a metal sleeve suitable for welding. Hereinafter all references to "optical fibre" or the short form "fibre" may include a sheathed or unsheathed light guide.

The optical fibre 11 is introduced intermediate the two fixing brackets 1 and approximately aligned to the optical source 9 e.g. a semiconductor laser diode. The fixing brackets 1 are positioned to engage the fibre 11 until all four contact faces 6 of the pair of fibre engagement means 5 make intimate contact with the fibre 11. The optical fibre 11 is thereby supported at two longitudinal positions along the length of the fibre.

In these positions, the fixing brackets 1 are then securely attached to their respective raised blocks 8 on the metal substrate 7 by laser spot welding, to prevent any further movement. The fixing brackets 1 are coupled to the fibre 11 by laser spot welding at the four contact faces 6 of the fibre engagement means 5 to the optical fibre 11.

The intimate nature of the contact between the alignment and fixing apparatus and the fibre after positioning minimises or eliminates the formation of gaps between the fibre and the alignment and fixing apparatus during the welding process. The step of positioning the fixing brackets 1 until contact is made between all four fibre engagement means 5 and the optical fibre 11 ensures that gaps are minimised between components and consequently reduces the dependence on component tolerances.

In the preferred embodiment, any post-weld fibre alignment correction can be performed by applying one or more distortional forces to the longer cantilever arms. Movement of the longer cantilever arm 4 leads to an attenuated movement of the shorter arm transmitted through the support block 2 and the fibre.

The relative movement of both the longer 4 and shorter 3 cantilever arms under the action of the distortional force is dependent on the ratio of lengths and the rigidity of each cantilever arm. The preferred length ratio is desired to be as large as is practicable, with the preferred five times minimum ratio originating from expected thermo-mechanical effects in the assembly which are equivalent to approximately 1 micron movements, producing ±0.2 micron displacements in the optical fibre position. This corresponds to the maximum fibre displacement allowable without significant power loss occurring in the optical coupling, between the fibre and optical source.

The inverse of the length ratio is an attenuation factor that, multiplied with the movement of the longer arm, gives an estimate of the movement of the shorter arm. The movement of the shorter arm is predominantly responsible for the alignment correction of the optical fibre.

A larger cross-section of the shorter arm 3 increases the effective ratio of the cantilever arm movements for a given length ratio and thereby causes a further attenuation of shorter arm movement resulting from longer movement.

In summary, applied lateral forces to the longer cantilever arms produce lateral displacements or distortions that are communicated to the shorter arms through the support members and fibre. The support members are preferably made from a material sufficiently malleable to plastically deform in the presence of the applied distortional force, and retain the new deformed shape after removal of the distortion forces.

A resultant distortion in the shorter cantilever is induced and together both cantilever arms exert a distorting influence on the fixed optical fibre. The positional distortions acting on the fibre induce the fibre to distort and compensate for any alignment errors incurred due to the fixing process. The fibre distortions may cause the fibre to adopt any one of a plurality of fibre configurations.

The distortional force is applied to the longer cantilever arms preferably at the farthest accessible point from the support member, for example using a two-axis manipulator means capable of sub-micron adjustments in the lateral directions. The distortional force applied to each longer cantilever arm may differ between the arms dependent on the particular fibre configuration required.

The optimum positional correction of the fibre is determined by adjusting the manipulator means to vary the applied distortional force to the longer cantilever arms, whilst monitoring the fibre transmittance in an optical feedback control loop resulting from lateral displacement of the fibre relative to the optical source imparted by the shorter cantilever arms. The fibre is variably distorted preferably until the highest degree of optical is coupling between the fibre and optical source is attained, at which point no further corrections are required. This situation corresponds to the final alignment of the fibre and eliminates, or substantially reduces, the effects of the post-weld fibre alignment error.

The cross-sectional areas and aspect ratios of the cantilever arm sections may be varied along the length of the arms by means of applying a taper or a step change to any or all faces of the section. Preferably, the cantilever cross-sectional area and aspect ratio profiles may be selected to suit the particular emission characteristics of the laser diode with respect to the post-weld positional correction required.

In the preferred embodiment, the properties of the cantilever arms may be pre-selected prior to fabrication of the fixing brackets so as to effect an optimum alignment of the fibre to the optical source, requiring minimal post-weld positional correction. The pre-selection of cantilever arm properties relies upon determining the distortional characteristics of the arms arising from their cross-sectional area and aspect ratio profiles.

The pre-selection process uses both mechanical and software models of the cantilever arm fixing apparatus, to predict the manner in which the arms will distort under a distortional force of given magnitude. The fixing bracket properties may be modelled to yield quantitative responses of how the apparatus will operate with an optical source of particular emission characteristics, and how the best optical coupling may be achieved for the minimum amount of post-weld positional correction.

The ability to pre-select the properties of the cantilever arms allows the post-weld positional correction to be minimised, since the distortional characteristics of the arms are known in advance. A smaller post-weld correction consequently increases the stability of the optical coupling throughout the operational lifetime of the fibre.

The distortion generated in both the longer and shorter arms by the application of a distortional force is equivalent to that produced in the presence of one or more fulcrum points, without any actual pivoting points being present. A virtual fulcrum position is generated in the vicinity of the fibre, by the action of a distortional force applied to the longer cantilever arms via the manipulator means. The virtual fulcrum effectively acts as a turning point about which turning effects of the distorted cantilever arms act. The turning effects of the cantilever arms distort the fibre into one of a plurality of fibre configurations. If more than one virtual fulcrum exists, the fibre will distort accordingly in respect of the turning effects acting in that particular region of the fibre. It is the turning effects arising from the distortional movement of the cantilever arms that are responsible for the fibre alignment correction.

The turning effects of the cantilever arms effectively act through the fulcrum point. Any change in fulcrum position will consequently modify the turning effects on the fibre and consequently alter the configuration so adopted by the fibre. The fulcrum position is dependent on the distortional characteristics of the cantilever arms, which arise from the cross-sectional area and aspect ratio profiles. Varying these properties along the length of the arms produces a varying rigidity profile along the length of the arm.

A varying rigidity along the length of the cantilever arm allows the arm to experience a differential distortion in response to a distortional force. This distortional characteristic may be pre-selected to permit fine adjustments to be made to the fibre alignment. A fulcrum position can be pre-selected by adapting the distortional characteristics of the cantilever arms, through modifying the cross-sectional area and aspect ratio profiles, so as to minimise the amount of post-weld positional correction required in the fibre alignment.

Other embodiments are intentionally within the scope of the accompanying claims.

The invention claimed is:

1. An apparatus for aligning and fixing an optical fibre relative to an optical source, comprising:
    first and second fixing brackets, each fixing bracket including:
    a support member for attachment to a substrate;
    first and second cantilever arms extending from the support member in opposing directions, each cantilever arm including fibre engagement means for engaging with the optical fibre and cantilevered to engage the engagement means with the optical fibre; and the apparatus further comprising a substrate including support means for receiving the support members so as to dispose the first and second fixing brackets such that the fibre engagement means of the first fixing bracket oppose the fibre engagement means of the second fixing bracket, for receiving and supporting an optical fibre therebetween at two longitudinal positions of the optical fibre.

2. The apparatus of claim 1 in which the first and second cantilever arms are of unequal length.

3. The apparatus of claim 2 in which the first cantilever arms are at least five times as long as the second cantilever arms.

4. An apparatus for aligning and fixing an optical fibre relative to an optical source, comprising:
first and second fixing brackets, each fixing bracket including:
a support member for attachment to a substrate;
first and second cantilever arms having different cross-sectional areas and extending from the support member in opposing directions, each cantilever arm including fibre engagement means for engaging with the optical fibre, and
the apparatus further comprising a substrate including support means for receiving the support members so as to dispose the first and second fixing brackets such that the fibre engagement means of the first fixing bracket oppose the fibre engagement means of the second fixing bracket, for receiving and supporting an optical fibre therebetween at two longitudinal positions of the optical fibre.

5. The apparatus of claim 4 in which the second cantilever arm has a greater cross-sectional area than the first cantilever arm.

6. The apparatus of claim 1 in which the cantilever arms have a rectangular cross-section.

7. The apparatus claim 1 in which at least one of the cantilever arms has varying cross-sectional area along its length.

8. The apparatus of claim 7 in which the at least one cantilever arm has a tapering cross-sectional area along its length.

9. The apparatus of claim 7 in which the at least one cantilever arm has a step change in cross-sectional area along its length.

10. The apparatus of claim 1 in which the support members each comprise a channel running therethrough.

11. The apparatus of claim 10 in which the channel runs substantially orthogonal to an axis extending between the fibre engagement means.

12. An apparatus for aligning and fixing an optical fibre relative to an optical source, comprising:
first and second fixing brackets, each fixing bracket including:
a support member for attachment to a substrate comprising a channel running therethrough;
first and second cantilever arms extending from the support member in opposing directions, each cantilever arm including fibre engagement means for engaging with the optical fibre;
the apparatus further comprising a substrate including support means for receiving the support members so as to dispose the first and second fixing brackets such that the fibre engagement means of the first fixing bracket oppose the fibre engagement means of the second fixing bracket, for receiving and supporting an optical fibre therebetween at two longitudinal positions of the optical fibre;
wherein the support means comprises a pair of blocks each adapted to engage with the respective channel of a respective support member.

13. The apparatus of claim 11 in which the fibre engagement means comprises a finger extending laterally from each one of the first and second cantilever arms.

14. The apparatus of claim 13 in which each finger includes an engagement surface for coupling to a wall of the optical fibre.

15. The apparatus of claim 1 in which each of the cantilever arms is plastically deformable.

16. The apparatus of claim 1 further including an optical fibre positioned between and supported by the fibre engagement means.

17. The apparatus of claim 16 in which the optical fibre is coupled to an engagement surface of each of the respective fibre engagement means by way of a sport weld.

18. The apparatus of claim 16 in which the optical fibre includes a sleeve encasing an optical carrier.

19. The apparatus of claim 1 further including an optical source fixed directly to the substrate or to an intermediate support means attached to the substrate.

20. The apparatus of claim 1 in which the first and second fixing brackets are formed from a metal suitable for welding.

21. The apparatus of claim 1 in which the substrate is formed from a metal suitable for welding.

22. The apparatus of claim 1 in which the support means are formed from a metal suitable for welding.

23. The apparatus of claim 19 in which the optical source is a semiconductor laser diode.

24. A method for aligning and fixing an optical fibre relative to an optical source comprising the steps of:
positioning first and second fixing brackets cantilevered in the direction of the fibre on a substrate such that first and second fibre engagement means of the first fixing bracket oppose first and second fibre engagement means of the second fixing bracket;
positioning an optical fibre intermediate the first and second fixing brackets for support therebetween at two longitudinal positions of the fibre;
securing the first and second fixing brackets to the optical fibre at the points of contact of the fibre engagement means to the fibre; and
adjusting the fibre alignment relative to the optical source, by adjusting the cantilevered fixing brackets.

25. The method of claim 24 further including the steps of, after positioning the optical fibre,
aligning the fibre to the optical source;
securing the first and second fixing brackets to support means included on the substrate.

26. A method for aligning and fixing an optical fibre relative to an optical source comprising the steps of:
positioning first and second fixing brackets on a substrate such that first and second fibre engagement means of the first fixing bracket oppose first and second fibre engagement means of the second fixing bracket;
positioning an optical fibre intermediate the first and second fixing brackets for support therebetween at two longitudinal positions of the fibre;
securing the first and second fixing brackets to the optical fibre at the points of contact of the fibre engagement means to the fibre;
adjusting the fibre alignment relative to the optical source comprising the steps of:

distorting a first cantilever arm of each of the first and second fixing brackets;

generating a resultant distortion in a second cantilever arm of each of the first and second fixing brackets in response to the distortion in the first cantilever arm; and correcting the alignment of the optical fibre as a consequence of the cantilever arm distortions.

27. The method of claim 26 in which the first cantilever arm of the first and second fixing brackets is distorted using a manipulator.

28. The method of claim 26 in which the second cantilever arm of the first and second fixing brackets responds to the distortion in the first cantilever arm of the first and second fixing brackets through plastic deformation of the support member of the first and second fixing brackets disposed therebetween.

29. The method of claim 26 in which the amount of distortional movement of the second cantilever arm of the first and second fixing brackets is attenuated compared to the distortional movement of the first cantilever arm of the first and second fixing bracket.

30. The method of claim 26 in which the rigidity of the first cantilever arm along the length of the arm is different to the rigidity of the second cantilever arm along the length of the arm.

* * * * *